United States Patent
Shinoda

(10) Patent No.: US 8,204,496 B2
(45) Date of Patent: *Jun. 19, 2012

(54) IN-VEHICLE WIRELESS COMMUNICATIONS DEVICE

(75) Inventor: Koji Shinoda, Chirya (JP)

(73) Assignee: Denso Corporation, Kariya (JP)

( * ) Notice: Subject to any disclaimer, the term of this patent is extended or adjusted under 35 U.S.C. 154(b) by 1332 days.

This patent is subject to a terminal disclaimer.

(21) Appl. No.: 11/369,915

(22) Filed: Mar. 7, 2006

(65) Prior Publication Data

US 2006/0220802 A1    Oct. 5, 2006

(30) Foreign Application Priority Data

Mar. 25, 2005   (JP) .................................. 2005-088546

(51) Int. Cl.
*H04W 24/00* (2009.01)
(52) U.S. Cl. ....... 455/423; 455/13.4; 455/297; 455/298; 455/343.1; 455/404.1
(58) Field of Classification Search ................. 455/13.4, 455/297, 298, 343.1, 404.1, 423
See application file for complete search history.

(56) References Cited

U.S. PATENT DOCUMENTS

| | | | |
|---|---|---|---|
| 5,159,257 A | 10/1992 | Oka et al. | |
| 6,630,749 B1 | 10/2003 | Takagi et al. | |
| 2002/0075165 A1* | 6/2002 | Yoshioka et al. | ............. 340/901 |
| 2003/0181169 A1 | 9/2003 | Mutoh | |
| 2005/0101287 A1* | 5/2005 | Jin et al. | ..................... 455/404.1 |
| 2005/0181837 A1 | 8/2005 | Sakai | |

FOREIGN PATENT DOCUMENTS

| | | |
|---|---|---|
| JP | 10-070844 A | 3/1998 |
| JP | 2001-157372 A | 6/2001 |
| JP | 2003-191803 | 7/2003 |
| JP | 2003-278418 A | 10/2003 |
| JP | 2004-023917 A | 1/2004 |

OTHER PUBLICATIONS

Office Action dated Aug. 24, 2007 in Chinese Patent Application No. 2006 1006 7654.1 with English translation thereof.
Office Action dated Jan. 6, 2009 in Japanese Patent Application No. 2005-088546.
Office Action dated Oct. 21, 2008 from the Japan Patent Office in the corresponding patent application No. 2005-088546 with English Translation.

* cited by examiner

*Primary Examiner* — Patrick Edouard
*Assistant Examiner* — Shantell L Heiber
(74) *Attorney, Agent, or Firm* — Harness, Dickey & Pierce, PLC

(57) ABSTRACT

An in-vehicle wireless communications device executes an emergency report operation to transmit an emergency report signal from a wireless communications unit to a wireless communications network. During this emergency report operation, integrated electric currents from an in-vehicle battery to an in-vehicle wireless communications device reach a predetermined value, which generates an interrupt. Even at this time, stopping of an operation power from the in-vehicle battery to the wireless communications unit is suspended until the emergency report operation is normally finished.

10 Claims, 4 Drawing Sheets

IN-VEHICLE WIRELESS COMMUNICATIONS DEVICE

CROSS REFERENCE TO RELATED APPLICATIONS

This application is based on and incorporates herein by reference Japanese Patent Application No. 2005-88546 filed on Mar. 25, 2005.

FIELD OF THE INVENTION

The present invention relates to an in-vehicle wireless communications device.

BACKGROUND OF THE INVENTION

An in-vehicle wireless communications device is mounted in a vehicle to transmit a theft report signal to a wireless communications network when a theft detection ECU of the vehicle turns on a theft detection signal indicating that a theft possibly occurs. To be always able to transmit the theft report signal, the in-vehicle wireless communications device is required so that its wireless communications unit be constantly supplied with an operation power. Here, supplying the operation power constantly to the wireless communications unit may cause an in-vehicle battery to be exhausted, for instance, when the vehicle is parked for a long period with the in-vehicle battery being discharged, which poses a problem.

To solve this problem, the Applicant proposed an in-vehicle wireless communications device that is described in Patent Document 1. Here, electric currents from the in-vehicle battery to the in-vehicle wireless communications device are integrated to obtain an integration value. When this integration value reaches a given value, an interrupt is generated to stop supplying the operation power to the wireless communications unit. This helps prevent the in-vehicle battery from being exhausted.

In this in-vehicle wireless communications device, while a theft report operation that transmits a theft report signal from its wireless communications unit to the wireless communications network, the electric integration value may reach the given value. At this time, the operation power is forcibly stopped even while the theft report operation takes place, which causes another problem not satisfying a user's intention that the theft report operation be normally finished.

Patent Document 1: JP-2005-255147 A (US 2005/0181837 A1)

SUMMARY OF THE INVENTION

It is an object of the present invention to provide an in-vehicle wireless communications device capable of properly completing an emergency report operation where a theft report signal is transmitted from a wireless communications unit to a wireless communications network.

To achieve the above object, an in-vehicle wireless communications device is provided with the following: A wireless communications unit is included for transmitting a signal of an emergency report to a wireless communications network. A power supply unit is included for supplying an operation power to the wireless communications unit by using an in-vehicle battery. An electric current integrating unit is included for (i) computing an electric current integration value by integrating electric currents from the in-vehicle battery to the wireless communications device when the in-vehicle battery is discharged and (ii) generating an interrupt when the electric current integration value reaches a predetermined value. A control unit is included for (i) starting an operation of the emergency report to cause the wireless communications unit to transmit the signal when a start trigger of the operation generates while the wireless communications unit is supplied with the operation power, and (ii) being enabled to cause the power supply unit to stop supplying the operation power when the interrupt is generated. Here, the control unit suspends, while the operation is executed, causing the power supply unit to stop supplying the operation power when the interrupt is generated, and then causes, after the operation is normally finished, the power supply unit to stop supplying the operation power.

Under the above structure, the operation power supply from the in-vehicle battery to the wireless communications unit is not stopped immediately after the interrupt is generated: The operation power supply to the wireless communications unit is secured until the emergency report operation is normally finished. The emergency report that the user requires can be thereby properly executed and completed.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
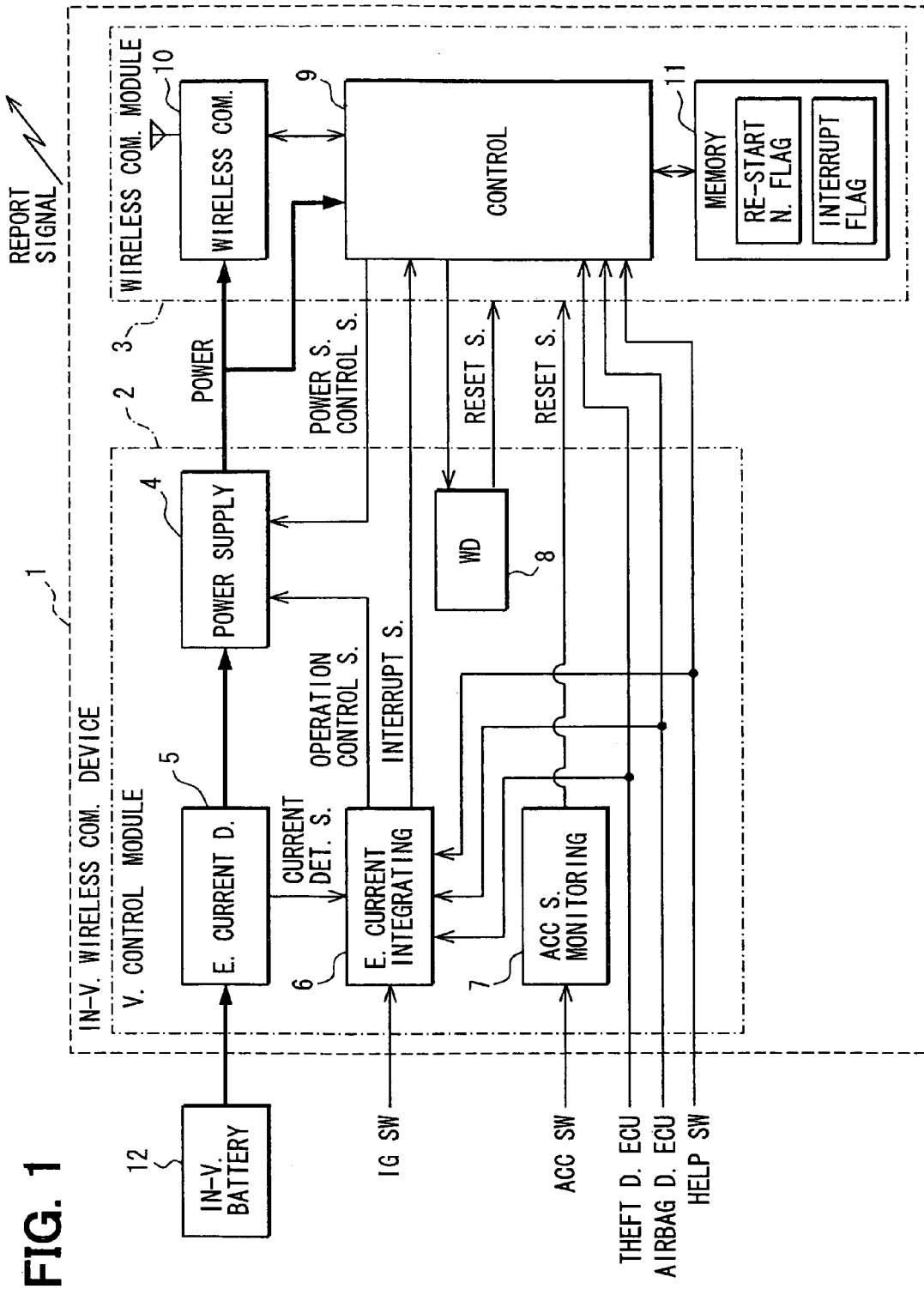
FIG. 1 is a functional block diagram of an overall structure of an in-vehicle wireless communications device according to an embodiment of the present invention.

An in-vehicle wireless communications device according to an embodiment of the present invention will be explained with reference to FIGS. 1 to 4. As shown in FIG. 1, an in-vehicle wireless communications device 1 includes a vehicle control module 2 and a wireless communications module 3. The vehicle control module 2 includes a power supply unit 4, an electric current detection unit 5, an electric current integrating unit 6, an accessory (ACC) signal monitoring unit 7, and a watch dog (WD) 8. The wireless communications module 3 includes a control unit 9, a wireless communications unit 10, and a nonvolatile memory 11.

The power supply unit 4 supplies the control unit 9 and the wireless communications unit 10 with their operation power that is battery power provided from an in-vehicle battery 12 via the electric current detection unit 5. The control unit 9 runs based on the operation power to control an operation of the wireless communications unit 10. For instance, the control unit 9 performs a theft report operation, an airbag report operation, or a help report operation. In the theft report operation, when a theft detection signal indicating possible theft from a theft detection ECU is turned on, a theft report signal is transmitted from the wireless communications unit 10 to the wireless communications network. In the airbag report operation, when an airbag detection signal indicating expansion of an airbag from an airbag detection ECU is turned on, an airbag report signal is transmitted from the wireless communications unit 10 to the wireless communications network.

In the help report operation, when a help detection signal indicating user's manipulating of a help switch from a help switch is turned on, a help report signal is transmitted from the wireless communications unit 10 to the wireless communications network.

In this embodiment, turning on of the theft detection signal, the airbag detection signal, or the help detection signal corresponds to a start trigger for an emergency report operation. Further, the theft report signal, the airbag report signal, or the help report signal corresponds to an emergency report signal. Further, the theft report operation, the airbag report operation, or the help report operation corresponds to an emergency report operation.

The electric current detection unit 5 turns on an electric current detection signal when electric currents are supplied from the in-vehicle battery 12. The electric current integrating unit 6 determines whether the in-vehicle battery 12 is being discharged or in a discharged state by determining whether an ignition signal from an ignition (IG) switch is turned off. When determining that the electric current detection signal is turned on while the in-vehicle battery 12 is being discharged, the electric current integrating unit 6 computes an integration value by integrating electric currents from the in-vehicle battery 12 to the electric current detection unit 5 as a consumed electric current of the in-vehicle wireless communications device 1. Further, the electric current integrating unit 6 compares the computed integration value with a predetermined value and turns on an interrupt signal when the computed integration value reaches the predetermined value.

When the interrupt signal from the electric current integrating unit 6 is turned on, the control unit 9 turns off a power supply control signal. When the power supply control signal from the control unit 9 is tuned off, the power supply unit 4 thereby stops the supply of the operation power to the control unit 9 and the wireless communications unit 10. Further, the electric current integrating unit 6 turns on an operation control signal when the ignition signal from the ignition switch is turned on. When the operation control signal from the electric current integrating unit 6 is turned on, the power supply unit 4 starts or re-starts the supply of the operation power to the control unit 9 and the wireless communications unit 10.

The accessory signal monitoring unit 7 turns on a reset signal when the accessory signal from the accessory switch is turned on. The watch dog 8 receives a state monitoring signal from the control unit 9 periodically while the control unit 9 normally operates: The watch dog 8 turns on a reset signal when the state signal is not periodically received from the control unit 9. The control unit 9 or the wireless communications module 3 executes a reset operation when the reset signal from the accessory signal monitoring unit 7 or from the watch dog 8 is turned on.

The nonvolatile memory 11 stores Re-start Necessity Flag and Interrupt Flag. Re-start Necessity Flag indicates necessity for re-start of an emergency report operation: Interrupt Flag indicates occurrence of an interrupt. The control unit 9 sets Re-start Necessity Flag when starting or re-starting an emergency report operation: The control unit 9 sets Interrupt Flag only when an interrupt is generated in the electric current integrating unit 6 while the control unit 9 executes an emergency report operation.

Figure 2:
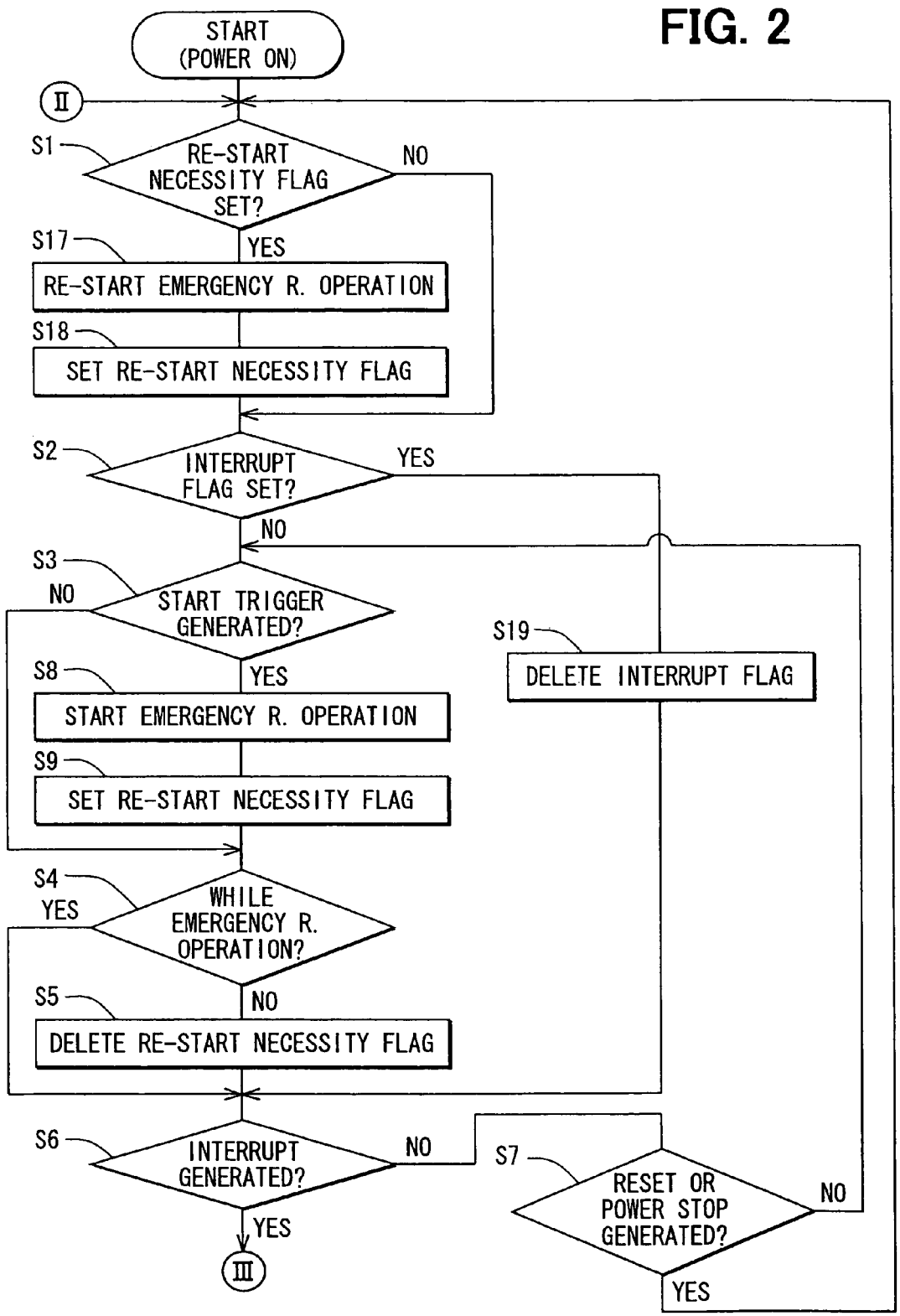
FIG. 2 is a flowchart diagram of an operation of the in-vehicle wireless communications device.
Figure 3:
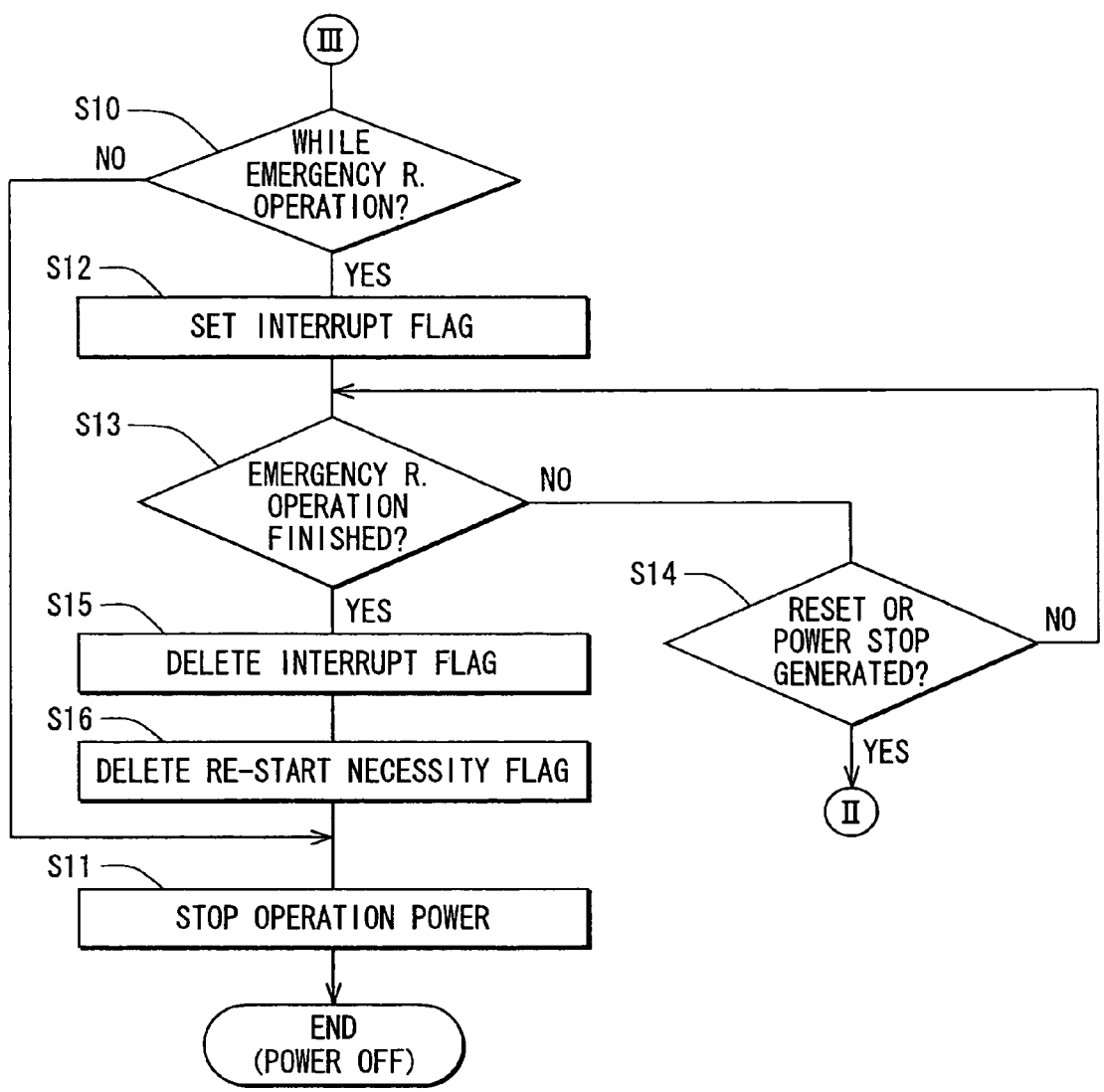
FIG. 3 is a flowchart diagram of another operation of the in-vehicle wireless communications device.
Figure 4:
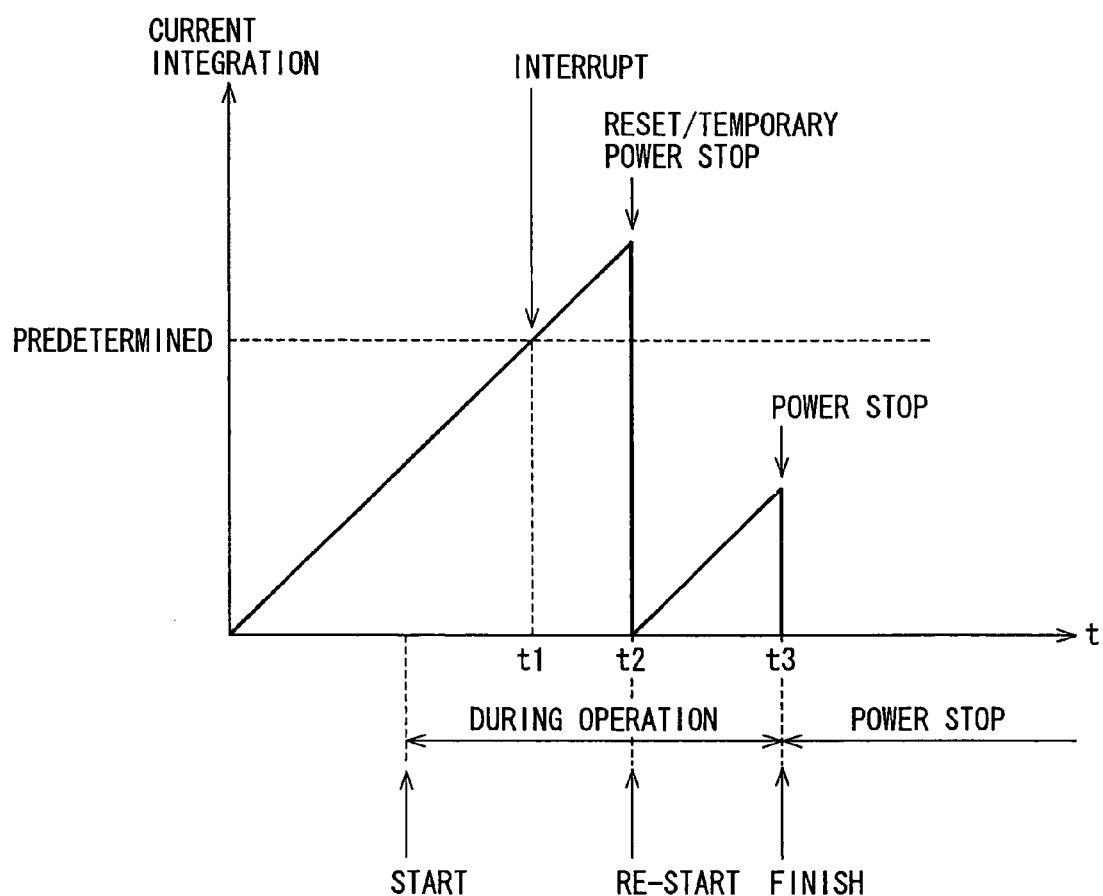
FIG. 4 is schematic time-basis transitions of an electric current integration value.

Next, an operation of the above structure will be explained with reference to FIGS. 2 to 4. The flowcharts in FIGS. 2, 3 are executed by the control unit 9. Here, in an initial state where no interrupt is generated in the electric current integrating unit 6, neither of Re-start Necessity Flag and Interrupt Flag are set. An emergency report operation will be explained by referring to a theft report operation, where the control unit 9 transmits a theft report signal from the wireless communications unit 10 to the wireless communications network when the theft detection ECU detects possibility of theft while the vehicle is being parked.

The flowchart starts under a state where the control unit 9 is supplied with the operation power from the power supply unit 4 in the in-vehicle wireless communications device 1. The control unit 9 determines whether Re-start Necessity Flag is set or whether re-start of an emergency report operation is necessary (Step S1). Here, in the initial state, since Re-start Necessity Flag is not set, the control unit 9 determines that Re-start Necessity Flag is not set (Step S1: NO). The control unit 9 then determines whether Interrupt Flag is set or whether the control unit 9 itself is executing an emergency report operation when an interrupt is generated in the electric current integrating unit 6 (Step S2).

Here, in the initial state, since Interrupt Flag is not set, the control unit 9 determines that Interrupt Flag is not set (Step S2: NO). The control unit 9 then determines whether a start trigger for an emergency report operation occurs (Step S3). When determining that no start trigger occurs (Step S3: NO), the control unit 9 determines whether an emergency report operation is being executed (Step S4). When determining that an emergency report operation is not being executed (Step S4: NO), the control unit 9 deletes Re-start Necessity Flag (Step S5) if Necessity Flag is previously set. The control unit 9 determines whether an interrupt is generated in the electric current integrating unit 6 (Step S6) and determines whether a reset or temporary power stop occurs (Step S7).

Further, in this embodiment, when the control unit 9 determines that a start trigger for a theft report operation occurs by determining that a theft detection signal from the theft detection ECU is turned on (Step S3: YES), the control unit 9 starts a theft report operation to transmit a theft report signal from the wireless communications unit 10 to the wireless communications network (Step S8). Then, Re-start Necessity Flag is set (Step S9).

Further, while the ignition switch is turned off, the electric current integrating unit 6 computes the electric current integration value by integrating electric currents from the in-vehicle battery 12 to the electric current detection unit 5 as a consumed electric current. When determining that the integration value reaches the predetermined value, the electric current integrating unit 6 turns on the interrupt signal. When the control unit 9 thereby determines that an interrupt is generated in the electric current integrating unit 6 (Step S6: YES), the control unit 9 then determines whether a theft report operation is being executed (Step S10).

In a case that the interrupt is generated without occurring of a start trigger for a theft report operation, the control unit 9 determines that an theft report operation is not being executed (Step S10: NO), turning off the power supply control signal to cause the power supply unit 4 to stop supplying the operation power to the wireless communications unit 10 (Step S11). The sequence of the flowchart is thereby ended.

In contrast, in a case that the interrupt occurs after a theft report operation is started due to occurrence of a start trigger for the theft report operation, the control unit 9 determines that the theft report operation is being executed (Step S10: YES), then setting Interrupt Flag (Step S12). Next, the control unit 9 determines whether the theft report operation is normally finished up to the predetermined final procedure (Step S13) and then determines whether a reset or temporary power stop occurs (Step S14).

When determining that the theft report operation is normally finished (Step S13: YES), the control unit 9 deletes settings of Interrupt Flag (Step S15) and Re-start Necessity Flag (Step S16), then turning off the power supply control signal to cause the power supply unit 4 to stop supplying the operation power (Step S11). The sequence of the flowchart thereby ends.

As explained in the above, the in-vehicle wireless communications device 1 performs as follows: Even when the electric current integration value reaches the predetermined value during the execution of the theft report operation and an interrupt thereby occurs, the stop of supplying the operation power from the in-vehicle battery 12 to the wireless communications unit 10 is deferred or suspended until the theft report operation is normally finished. That is, after the theft report operation is normally finished, supplying the operation power is stopped.

In contrast, with a reset occurring due to turning on of the reset signal from the ACC signal monitoring unit 7 or watch dog 8 or with the supply of the operation power from the power supply unit 4 temporarily stopping before the normal finish of the theft report operation, the control unit 9 returns to Step S1.

Next, after returning to Step S1, the control unit 9 determines again whether Re-start Necessity Flag is set or whether the theft report operation is required to be re-started. Here, Re-start Necessity Flag is previously set: the control unit 9 determines that the theft report operation is required to be re-started (Step S1: YES), then re-starting the theft report operation (Step S17) and setting Re-start Necessity Flag (Step S18). The control unit 9 further determines again whether Interrupt Flag is previously set (Step S2).

At this time, Interrupt Flag is previously set: the control unit 9 determines that Interrupt Flag is previously set (Step S2: YES), then deleting the setting of Interrupt Flag (Step S19). The sequence then returns to Steps S6, S7, the sequence subsequent to Steps S6, S7 is repeatedly executed.

Based on the above explained flowchart, the in-vehicle wireless communications device 1 performs as follows, with reference to FIG. 4: When electric currents from the in-vehicle battery 12 to the in-vehicle wireless communications device 1 reaches the predetermined value during the execution of a theft report operation, an interrupt is generated (refer to "t1"). Here, regardless of occurrence of the interrupt, the stop of supplying the operation power to the wireless communications unit 10 is suspended. Further, even when a reset or a temporary power stop occurs with the interrupt generated, the theft report operation is re-started (refer to "t2") and the stop of supplying the operation power is suspended until the theft report operation is finished (refer to "t3").

The flowchart is explained by referring to a theft report operation for the control unit 9 to transmit a theft report signal from the wireless communications unit 10 to the wireless communications network based on that the theft detection ECU detects the possibility of theft while the relevant vehicle is being parked. Alternatively, the flowchart can be executed when an airbag detection ECU expands the airbag or a user manipulates the help switch while the ignition signal is turned off because of occurrence of a vehicle accident.

That is, even when the electric current integration value reaches the predetermined value during the execution of the airbag report operation or the help report operation and an interrupt is thereby generated, the stop of supplying the operation power from the in-vehicle battery 12 to the wireless communications unit 10 is deferred or suspended until the corresponding report operation is normally finished. That is, after the airbag report operation or help report operation is normally finished, the stop of supplying the operation power is executed.

Further, the in-vehicle wireless communications device 1 performs as follows: When an electric current integration value from the in-vehicle battery 12 to the in-vehicle wireless communications device 1 reaches the predetermined value during the execution of the airbag or help report operation, an interrupt is generated. Here, regardless of occurrence of the interrupt, the stop of supplying the operation power to the wireless communications unit 10 is suspended. Yet further, when a reset or a temporary power stop occurs with the interrupt generated, the airbag or help report operation is re-started and the stop of supplying the operation power is suspended until the airbag or help report operation is finished.

According to the above structure, the supply of the operation power from the in-vehicle battery 12 to the wireless communications unit 10 is not stopped immediately after the interrupt is generated, so the operation power to the wireless communications unit 10 is secured until an emergency report operation is normally finished. The emergency report that the user requires is properly executed and completed.

Further, also even when the reset or temporary power stop occurs with the interrupt generated before the emergency report operation is normally finished, the operation power to the wireless communications unit 10 is not immediately stopped until the emergency report operation is normally finished. Similarly, the emergency report that the user requires is properly executed and completed.

The present invention is not limited to the above embodiment: modification or extension can be made as follows: Determining whether the in-vehicle battery is being discharged can be made based on an input state of an accessory signal in stead of the ignition signal. Namely, when the accessory signal is turned off, the in-vehicle battery can be determined to be being discharged.

In the emergency report operation, any report signal indicating an emergency state other than the theft report signal, airbag report signal, or help report signal can be transmitted to the wireless communications network.

The steps in the above explained flowcharts may be constructed as means or units in the program executed by the control unit 9 of the in-vehicle wireless communications device 1.

It will be obvious to those skilled in the art that various changes may be made in the above-described embodiments of the present invention. However, the scope of the present invention should be determined by the following claims.

What is claimed is:

1. An in-vehicle wireless communications device, comprising:
   a wireless communications unit for transmitting a signal of an emergency report to a wireless communications network;
   a power supply unit for supplying power to the wireless communications unit from an in-vehicle battery;
   an electric current integrating unit for
      computing an electric current integration value by integrating electric currents from the in-vehicle battery when the in-vehicle battery is being discharged, while continuing, even while the emergency report is being transmitted, the computing of the electric current integration value when the in-vehicle battery is being discharged, and
      generating an interrupt when the electric current integration value reaches a predetermined value; and
   a control unit for
      starting an operation of the emergency report to cause the wireless communications unit to transmit the signal when a start trigger of the operation is generated while the wireless communications unit is supplied with the power from the in-vehicle battery, and being enabled to cause the power supply unit to stop supplying the power from the in-vehicle battery when the interrupt is generated, wherein the control unit suspends, while the operation is being executed using the power from the in-vehicle battery, the causing of the power supply unit to stop supplying the power when the interrupt is generated, and then causes, after the operation is normally finished, the power supply unit to stop supplying the power to the wireless communication device.

2. The in-vehicle wireless communications device of claim 1, wherein even in a case where a reset or a temporary power stop generates while the operation is executed, the control unit suspends, while the operation is being executed, the causing of the power supply unit to stop supplying the power when the interrupt is generated, and then causes, after the operation is normally finished, the power supply unit to stop supplying the power.

3. The in-vehicle wireless communications device of claim 1, wherein the in-vehicle battery is a single in-vehicle battery.

4. An in-vehicle wireless communication device comprising:

a wireless communications unit for transmitting an emergency report to a wireless communications network;

a power supply unit for supplying power to the wireless communications unit from an in-vehicle battery;

means for computing an electric current integration value by integrating electric currents from the in-vehicle battery when the in-vehicle battery is being discharged, the computing means being further configured to continue, even while the emergency report is being transmitted, the computing of the electric current integration value when the in-vehicle battery is being discharged;

means for generating an interrupt when the electric current integration value reaches a predetermined value;

means for starting the transmission of the emergency report by the wireless communications unit due to the generation of a start trigger while the communications unit is supplied with power from said in-vehicle battery;

means for stopping the supply of power from the in-vehicle battery when the interrupt is generated;

means for suspending the operation of the stopping means until completion of the transmission of the emergency report once the wireless communications unit has started the transmission of the emergency report.

5. The in-vehicle wireless communications device of claim 4, wherein the in-vehicle battery is a single in-vehicle battery.

6. The in-vehicle wireless communications device of claim 4, further comprising:

means for interrupting the operation of the suspending means due to a reset or a temporary power stop, then re-starting the operation of the suspending means by suspending the operation of the stopping means until the completion of the transmission of the emergency report.

7. The in-vehicle wireless communications device of claim 4, further comprising:

means for setting an interrupt flag according to the generation of the interrupt when the electric current integration value reaches the predetermined value and the emergency report is being transmitted; and means for deleting the setting of the interrupt flag when the transmission of the emergency report is completed.

8. A method for transmitting an emergency report to a wireless communications network in an in-vehicle wireless communication device having a power supply unit for supplying power to the wireless communications device from an in-vehicle battery, the method comprising:

computing an electric current integration value by integrating electric currents from the in-vehicle battery when the in-vehicle battery is being discharged, the computing of the electric current integration value being continued even while the emergency report is being transmitted;

generating an interrupt when the electric current integration value reaches a predetermined value;

starting the transmission of the emergency report by the wireless communications device due to the generation of a start trigger while the communications device is supplied with power from the in-vehicle battery;

stopping the supply of power from the in-vehicle battery when the interrupt is generated when the wireless communications device does not transmit the emergency report; and continuing, even when the interrupt is generated, the supply of the power from the in-vehicle battery to the wireless communications device until completion of the transmission of the emergency report once the wireless communications device has started the transmission of the emergency report.

9. The method of claim 8, further comprising:

interrupting the transmission of the emergency report due to a reset or a temporary power stop, then re-starting the supply of the power from the in-vehicle battery to the wireless communications device by the completion of the transmission of the emergency report.

10. The method of claim 8, further comprising:

setting an interrupt flag according to the generation of the interrupt when the electric current integration value reaches the predetermined value and the emergency report is being transmitted; and deleting the setting of the interrupt flag when the transmission of the emergency report is completed, thus stopping the supply of power from the in-vehicle battery to the wireless communications device.

* * * * *